US011878537B2

(12) United States Patent
Chen et al.

(10) Patent No.: US 11,878,537 B2
(45) Date of Patent: Jan. 23, 2024

(54) PRINTING CONTROL METHOD, DEVICE AND STORAGE MEDIUM

(71) Applicant: SHENZHEN HOSONSOFT CO., LTD, Guangdong (CN)

(72) Inventors: Yan Chen, Guangdong (CN); Shubo Su, Guangdong (CN); Zhenjin Huang, Guangdong (CN); Zhongkun Huang, Guangdong (CN)

(73) Assignee: SHENZHEN HOSONSOFT CO., LTD, Guangdong (CN)

( * ) Notice: Subject to any disclaimer, the term of this patent is extended or adjusted under 35 U.S.C. 154(b) by 215 days.

(21) Appl. No.: 17/417,076

(22) PCT Filed: Sep. 28, 2019

(86) PCT No.: PCT/CN2019/108798

§ 371 (c)(1),
(2) Date: Jun. 21, 2021

(87) PCT Pub. No.: WO2020/125122

PCT Pub. Date: Jun. 25, 2020

(65) Prior Publication Data

US 2022/0055387 A1 Feb. 24, 2022

(30) Foreign Application Priority Data

Dec. 21, 2018 (CN) ......................... 201811571144.7
Apr. 29, 2019 (CN) ......................... 201910356241.2

(51) Int. Cl.
*B41J 25/00* (2006.01)

(52) U.S. Cl.
CPC .................................. *B41J 25/006* (2013.01)

(58) Field of Classification Search
CPC .... B41J 2/2132; B41J 2/2117; B41J 2/04573; B41J 2/07; B41J 19/142; B41J 2/04581; B41J 2/04588; B41J 25/006; B29C 64/386; B33Y 50/02
See application file for complete search history.

(56) References Cited

U.S. PATENT DOCUMENTS 8,740,351 B2 * 6/2014 Tsuboi ................... B41J 2/2132 347/41
2013/0194334 A1 * 8/2013 Watanabe ............. B41J 25/006 347/12
2014/0307017 A1 * 10/2014 Kaneko .................. B41J 2/2125 347/15
2015/0109361 A1 * 4/2015 Watanabe ............. B41J 25/006 347/14
2018/0281446 A1 * 10/2018 Kayanaka .............. B41J 19/147
2019/0344581 A1 * 11/2019 Yamaguchi .......... B41J 2/04573
2020/0086653 A1 * 3/2020 Katsuyama ........ G06K 15/1881

* cited by examiner

*Primary Examiner* — John Zimmermann

(57) ABSTRACT

A printing control method, a printing control device and a storage medium are provided. The method includes steps of: acquiring first scan times of first ink used for printing a unit area; acquiring second scan times of second ink used for printing a unit area; comparing the first scan times with the second scan times; according to a comparison result, controlling a printer to eject the first ink or/and the second ink in each scan in a main scan direction. The method and device are able to efficiently and quickly print a three-dimensional effect image.

19 Claims, 7 Drawing Sheets

PRINTING CONTROL METHOD, DEVICE AND STORAGE MEDIUM

BACKGROUND OF THE PRESENT INVENTION

Field of Invention

The present invention relates to a field of inkjet printing technologies, and more particularly, to a printing control method, a printing control device, and a storage medium.

Description of Related Arts

An inkjet printer ejects ink drops onto a printing medium from a nozzle of an inkjet head to form an image or a word. The inkjet printer may perform the printing process through a shuttle scanning printing, a single scanning printing, or a multi-inkjet-head in parallel scanning printing, etc. The shuttle scanning printing is also called multiple-pass scanning printing which indicates that each unit of the to-be-printed image is printed by multiple interpolations, and each unit is formed by multiple image pixels. For example, a 2-pass scanning printing indicates that each unit of the to-be-printed image is formed by two pixels; a 3-pass scanning printing indicates that each unit of the to-be-printed image is formed by three pixels. The single scanning printing is also called single-pass scanning printing which indicates that each unit of the to-be-printed image is printed by one scanning. The multi-inkjet-head in parallel scanning printing is also called one-pass scanning printing which indicates that the to-be-printed image is printed by one printing. All of the printing methods mentioned above are mainly used to print images of two-dimensional effect.

However, with the development of the printing technology, printers can now print images with three-dimensional effect or works such as ink paintings with heavy ink. The method to print these works comprises steps of: setting a substrate area and an embossed area for the image to be printed, and using white ink of different concentrations to print the substrate area and the embossed area, so that the substrate area and the embossed area can form obvious layers and present a three-dimensional effect. In another example, in order to make the color of ink paintings look better, it needs to print a layer of white ink as a substrate onto which the color ink will be printed. However, the quantities of color ink and white ink required by the three-dimensional effect images and the ink paintings may be different; the printing of three-dimensional effect images may require more white ink, while the ink paintings may require more color ink.

For the above-mentioned cases, in prior art, the conventional printing method is to print the color ink onto the white ink layer or layers when it needs to print multiple layers of white ink. The above-described printing process has the low printing efficiency and needs positioning respectively when printing the white ink and the color ink, which will be cumbersome and may make errors in positioning.

SUMMARY OF THE PRESENT INVENTION

The present invention provides a printing control method and device able to efficiently and quickly print a three-dimensional effect image or an ink painting, and a storage medium, for solving the problem mentioned above.

In one aspect, the present invention provides a printing control method, comprising steps of:

acquiring first scan times of first ink used for printing a unit area;

acquiring second scan times of second ink used for printing a unit area;

comparing the first scan times with the second scan times; and, according to a comparison result, controlling a printer to eject the first ink or/and the second ink in each scan in a main scan direction.

Preferably, the printing control method further comprises steps of: setting a value of the first scan times to "a", and setting a value of the second scan times to "b", wherein a, $b \in 2^n$, n is a natural number, and a length of an end face on which nozzles of an inkjet head are located is "x";

when a=b, ejecting the first ink and the second ink at the same time in each ink-ejecting process, and then moving the inkjet head by a distance of x/a relative to a printing medium.

Preferably, the printing control method further comprises steps of: setting the value of the first scan times to "a", and setting the value of the second scan times to "b", wherein a, $b \in 2^n$, n is a natural number, and the length of the end face on which the nozzles of the inkjet head are located is "x";

when a≠1 or b≠1, and a/b≥1, moving the inkjet head by a distance of x/a in a sub-scan direction which is perpendicular to the main scan direction after finishing each scan in the main scan direction; ejecting the first ink when the inkjet head is printing in the main scan direction after it moves by a distance of x/a in the sub-scan direction; and, ejecting the second ink when the inkjet head is printing in the main scan direction after it moves by a distance of x/b in the sub-scan direction.

Preferably, the printing control method further comprises steps of: setting the value of the first scan times to "a", and setting the value of the second scan times to "b", wherein a, $b \in 2^n$, n is a natural number, and the length of the end face on which the nozzles of the inkjet head are located is "x";

when a/b<1, moving the inkjet head by a distance of x/b in the sub-scan direction which is perpendicular to the main scan direction after finishing each scan in the main scan direction; ejecting the first ink when the inkjet head is printing in the main scan direction after it moves by a distance of x/a in the sub-scan direction; and, ejecting the second ink when the inkjet head is printing in the main scan direction after it moves by a distance of x/b in the sub-scan direction.

Preferably, the step of "according to a comparison result, controlling a printer to eject the first ink or/and the second ink in each scan in a main scan direction" specifically comprises steps of:

according to the comparison result, performing a filtering process on image data corresponding to the first ink or/and image data corresponding to the second ink to obtain first printing data corresponding to the first ink and second printing data corresponding to the second ink, and making scan times of printing a unit area according to the first printing data same as scan times of printing a unit area according to the second printing data; and, according to the first printing data and the second printing data, controlling the printer to eject the first ink and the second ink in each scan in the main scan direction.

Preferably, the value of the first scan times is set to "a", and the value of the second scan times is set to "b", wherein a≥1, b≥1, n>1, a, b and n are integers; when a=nb, the step of "according to the comparison result, performing a filtering process on image data corresponding to the first ink or/and image data corresponding to the second ink to obtain first printing data corresponding to the first ink and second printing data corresponding to the second ink, and making scan times of printing a unit area according to the first printing data same as scan times of printing a unit area according to the second printing data" specifically comprises steps of:

according to the comparison result, performing the filtering process on the image data corresponding to the second ink to obtain the second printing data corresponding to the second ink; and recording the image data corresponding to the first ink as the first printing data without any adjustments, so as to make the scan times of printing a unit area according to the first printing data same as the scan times of printing a unit area according to the second printing data.

Preferably, the value of the first scan times is set to "a", and the value of the second scan times is set to "b", wherein $a \geq 1$, $b \geq 1$, $n>1$, a, b and n are integers; when $b=na$, the step of "according to the comparison result, performing a filtering process on image data corresponding to the first ink or/and image data corresponding to the second ink to obtain first printing data corresponding to the first ink and second printing data corresponding to the second ink, and making scan times of printing a unit area according to the first printing data same as scan times of printing a unit area according to the second printing data" specifically comprises steps of:

according to the comparison result, performing the filtering process on the image data corresponding to the first ink to obtain the first printing data corresponding to the first ink; and recording the image data corresponding to the second ink as the second printing data without any adjustments, so as to make the scan times of printing a unit area according to the first printing data same as the scan times of printing a unit area according to the second printing data.

Preferably, the value of the first scan times is set to "a", and the value of the second scan times is set to "b", wherein $a \geq 1$, $b \geq 1$, $n \geq 1$ and $m \geq 1$, a, b, n and m are integers; when $a \neq nb$ and $b \neq ma$, the step of "according to the comparison result, performing a filtering process on image data corresponding to the first ink or/and image data corresponding to the second ink to obtain first printing data corresponding to the first ink and second printing data corresponding to the second ink, and making scan times of printing a unit area according to the first printing data same as scan times of printing a unit area according to the second printing data" specifically comprises steps of:

according to the comparison result, performing the filtering process on the image data corresponding to the first ink and the image data corresponding to the second ink to obtain respectively the first printing data corresponding to the first ink and the second printing data corresponding to the second ink, and making the scan times of printing a unit area according to the first printing data same as the scan times of printing a unit area according to the second printing data.

Preferably, both the scan times of printing a unit area according to the first printing data and the scan times of printing a unit area according to the second printing data are set to "c", and the length of the end face on which the nozzles of the inkjet head are located is "x"; the step of "according to the first printing data and the second printing data, controlling the printer to eject the first ink and the second ink in each scan in the main scan direction" specifically comprises steps of:

according to the first printing data and the second printing data, controlling the printer to eject the first ink and the second ink in each scan in the main scan direction and then move by a distance of x/c in the sub-scan direction.

Preferably, the image data comprise a plurality of sub-image data; the first printing data and the second printing data respectively comprise a plurality of sub-printing data; a piece of sub-printing data corresponds to one scan of the inkjet head in the main scan direction, and a piece of sub-printing data also corresponds to a piece of sub-image data.

Preferably, the step of "according to the comparison result, performing a filtering process on image data corresponding to the first ink or/and image data corresponding to the second ink to obtain first printing data corresponding to the first ink and second printing data corresponding to the second ink, and making scan times of printing a unit area according to the first printing data same as scan times of printing a unit area according to the second printing data" specifically comprises steps of:

determining whether the scan times of printing a unit area according to the first printing data and the scan times of printing a unit area according to the second printing data are the same or not, and acquiring revised scan times according to the comparison result;

acquiring filtering data according to the revised scan times, wherein the filtering data are either first template data or second template data, and the first template data are complementary to the second template data;

according to the revised scan times, acquiring the filtering data which are determined by the filtering process performed on the sub-image data corresponding to the first ink or/and the second ink in each scan; and, according to the filtering data, acquiring the sub-printing data by performing the filtering process on the sub-image data corresponding to the first ink or/and the second ink in each scan.

Preferably, the first ink comprises white ink used for printing a substrate area and white ink used for printing an embossed area, and the second ink is one or more of cyan ink, magenta ink, yellow ink and black ink; and the step of ejecting the first ink specifically comprises steps of:

sending first data channel information to a first inkjet unit of the inkjet head, and controlling the first inkjet unit to print the white ink on the substrate area of the printing medium; and, sending second data channel information to a second inkjet unit of the inkjet head, and controlling the second inkjet unit to print the white ink on the embossed area of the printing medium.

Preferably, the first data channel information comprises substrate area information of a to-be-printed image and concentration information of the white ink used for printing the substrate area, and the second data channel information comprises embossed area information of the to-be-printed image and concentration information of the white ink used for printing the embossed area.

Preferably, the first data channel information comprises the substrate area information of the to-be-printed image, the concentration information of the white ink used for printing the substrate area, the embossed area information of the to-be-printed image and the concentration information of the white ink used for printing the embossed area; and the second data channel information comprises the embossed area information of the to-be-printed image and the concentration information of the white ink used for printing the embossed area.

According to a second aspect, the present invention provides a printing control device, comprising: at least one processor, at least one memory, and a computer program instruction of the printing control method stored in the memory, wherein: when the computer program instruction is executed by the processor, the printing control method is implemented through steps of:

acquiring the first scan times of the first ink used for printing a unit area;

acquiring the second scan times of the second ink used for printing a unit area;

comparing the first scan times with the second scan times; and, according to the comparison result, controlling the printer to eject the first ink or/and the second ink in each scan in the main scan direction.

Preferably, when the computer program instruction is executed by the processor, the implemented printing control method further comprises steps of:

setting the value of the first scan times to "a", and setting the value of the second scan times to "b", wherein a, $b \in 2^n$, n is a natural number, and the length of the end face on which the nozzles of the inkjet head are located is "x";

when a=b, ejecting the first ink and the second ink at the same time in each ink-ejecting process, and then moving the inkjet head by a distance of x/a relative to the printing medium.

Preferably, when the computer program instruction is executed by the processor, the implemented printing control method further comprises steps of:

setting the value of the first scan times to "a", and setting the value of the second scan times to "b", wherein a, $b \in 2^n$, n is a natural number, and the length of the end face on which the nozzles of the inkjet head are located is "x";

when $a \neq 1$ or $b \neq 1$, and $a/b \geq 1$, moving the inkjet head by a distance of x/a in the sub-scan direction which is perpendicular to the main scan direction after finishing each scan in the main scan direction; ejecting the first ink when the inkjet head is printing in the main scan direction after it moves by a distance of x/a in the sub-scan direction; and, ejecting the second ink when the inkjet head is printing in the main scan direction after it moves by a distance of x/b in the sub-scan direction.

Preferably, when the computer program instruction is executed by the processor, the implemented printing control method further comprises steps of:

setting the value of the first scan times to "a", and setting the value of the second scan times to "b", wherein a, $b \in 2^n$, n is a natural number, and the length of the end face on which the nozzles of the inkjet head are located is "x";

when $a/b < 1$, moving the inkjet head by a distance of x/b in the sub-scan direction which is perpendicular to the main scan direction after finishing each scan in the main scan direction; ejecting the first ink when the inkjet head is printing in the main scan direction after it moves by a distance of x/a in the sub-scan direction; and, ejecting the second ink when the inkjet head is printing in the main scan direction after it moves by a distance of x/b in the sub-scan direction.

Preferably, the first ink comprises the white ink used for printing the substrate area and the white ink used for printing the embossed area, and the second ink is one or more of the cyan ink, the magenta ink, the yellow ink and the black ink.

According to a third aspect, the present invention provides a storage medium, for storing the computer program instruction; when the computer program instruction is executed by the processor, the printing control method is implemented.

Beneficial Effect

Compared with the prior art, by controlling the printer to eject the first ink or/and the second ink in each scan in the main scan direction according to the comparison result of the first scan times and the second scan times, the printing control method, the printing control device and the storage medium provided in the present invention are able to print the whole preset image. Since the image is completed only by printing once and there is no need for multiple positioning, the three-dimensional effect image can be printed efficiently and quickly.

DETAILED DESCRIPTION OF THE PREFERRED EMBODIMENT

In order to make the objectives, technical solutions, and advantages of the present invention clearer, the present invention will be further illustrated with reference to the accompanying drawings and embodiments. It should be understood that the specific embodiments described herein are only to explain the present invention, not to limit the present invention. For those skilled in the art, other embodiments made based on the embodiments of the present invention without creative efforts should be all encompassed in the protection scope of the present invention.

It should be noted that, in this specification, terms like "first" and "second" are only used for descriptive purposes, and cannot be understood as indicating or implying their relative importance or implicitly indicating the number of indicated technical features. Therefore, the features defined with "first" and "second" may explicitly or implicitly comprise at least one of the features. In addition, the technical solutions between the various embodiments can be combined with each other, but the combined technical solutions must be based on what can be achieved by those of ordinary skill in the art. When the combination of technical solutions is contradictory or cannot be realized, it should be considered that such a combination of technical solutions does not exist, and is not within the protection scope of the present invention.

Figure 1:
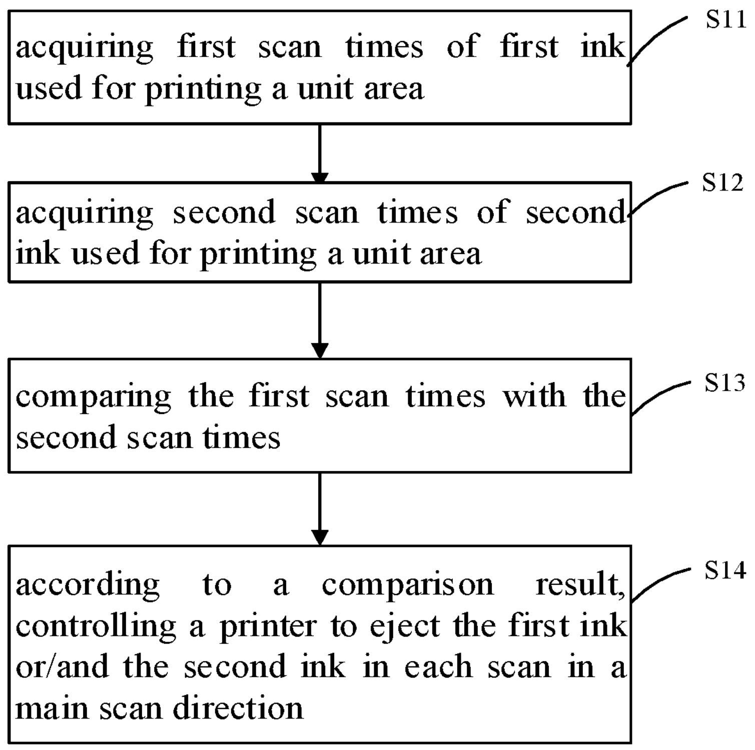
FIG. 1 is a flow chart of a printing control method according to a preferred embodiment of the present invention.

Referring to FIG. 1, the present invention provides a printing control method, comprising steps of:

(S11) acquiring first scan times of first ink used for printing a unit area; wherein:

the first ink can be white ink, or one or more of cyan ink (C), magenta ink (M), yellow ink (Y), and black ink (K), which is not specifically limited here; the unit area can be 0.01 square millimeter or 0.1 square millimeter, etc., and its size can be set according to requirements, which is not specifically limited here; the first scan times of the first ink are ejecting times of an inkjet head in the unit area;

(S12) acquiring second scan times of second ink used for printing a unit area; wherein:

the second ink can be white ink, or one or more of cyan ink (C), magenta ink (M), yellow ink (Y), and black ink (K), which is not specifically limited here;

(S13) comparing the first scan times with the second scan times; and, (S14) according to a comparison result, controlling a printer to eject the first ink or/and the second ink in each scan in a main scan direction.

Figure 2:
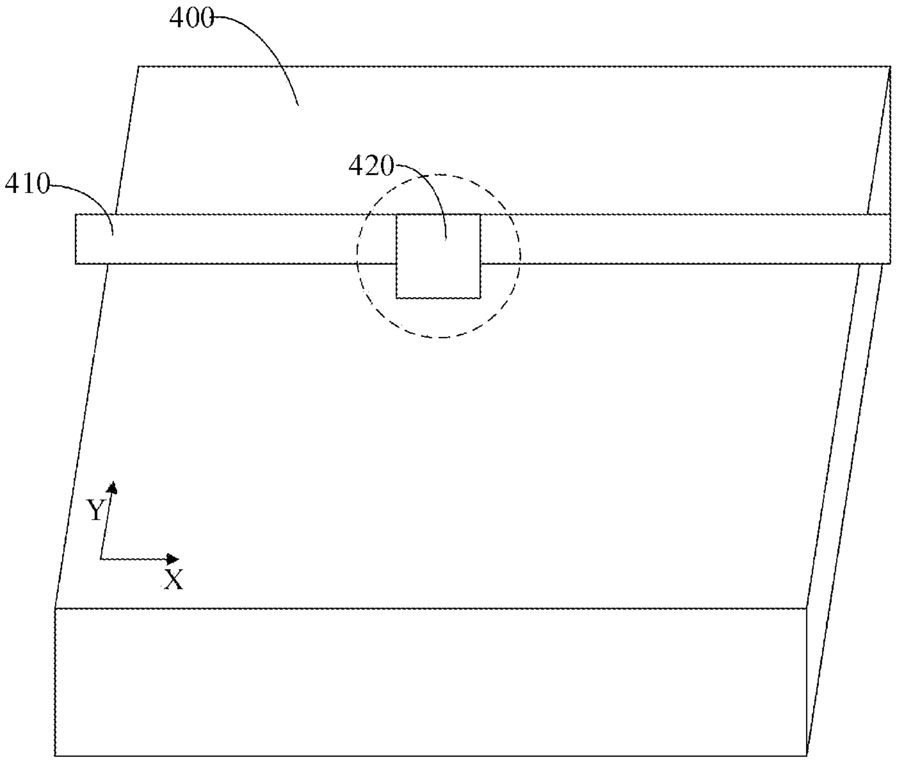
FIG. 2 is a schematic view showing a printer according to the preferred embodiment of the present invention.
Figure 3:
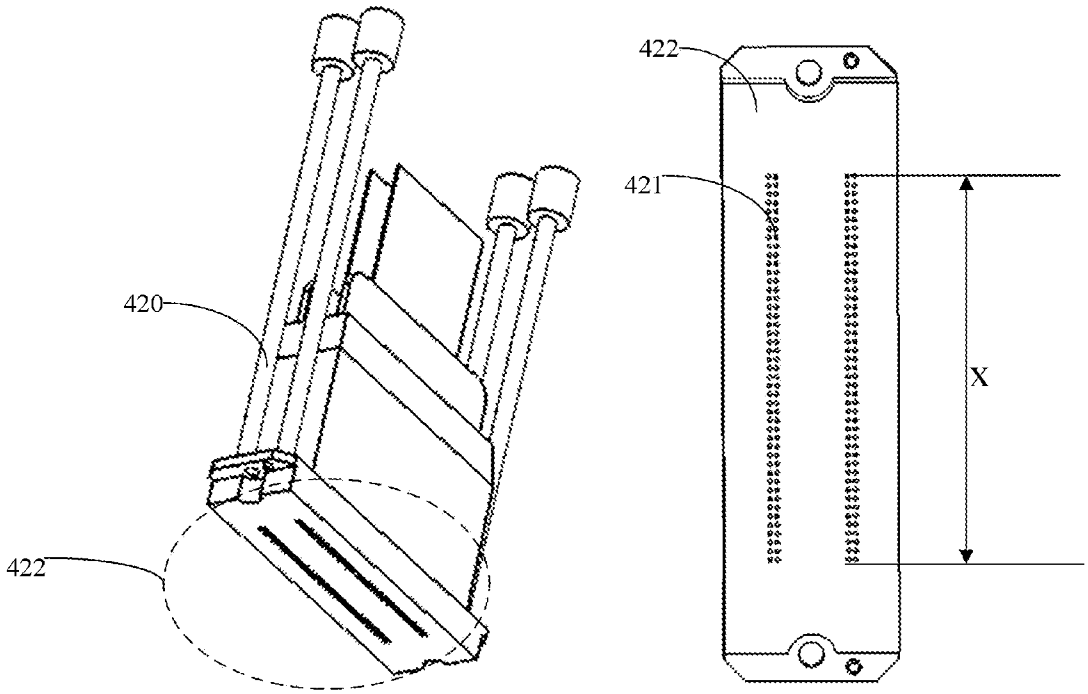
FIG. 3 is a schematic view showing an inkjet head according to the preferred embodiment of the present invention.

Referring to FIG. 2 and FIG. 3, in the preferred embodiment, the main scan direction is a direction of X-axis of the printer 400, a sub-scan direction is a direction of Y-axis of the printer 400, the sub-scan direction is perpendicular to the main scan direction, and a beam 410 of the printer 400 is in the X-axis direction. The printer 400 further comprises an inkjet head 420 for ejecting the first ink and the second ink. The inkjet head 420 has a number of nozzles 421 thereon. An end face 422 on which the nozzles of the inkjet head 420 are located is in the Y-axis direction.

In the preferred embodiment, a value of the first scan times is set to "a", and a value of the second scan times is set to "b", wherein a, b$\in 2^n$, n is a natural number, and a length of the end face on which the nozzles are located is "x";

when a=b=1, the first ink and the second ink are ejected at the same time in each ink-ejecting process, and then the inkjet head moves by a distance of x relative to a printing medium; in the preferred embodiment, all of the unit areas of a to-be-printed image can be completed by printing once, which has the high printing speed and high efficiency;

when a≠1 or b≠1, and a/b≥1, the inkjet head moves by a distance of x/a in the sub-scan direction which is perpendicular to the main scan direction after finishing each scan in the main scan direction; wherein the first ink is ejected when the inkjet head is printing in the main scan direction after it moves by a distance of x/a in the sub-scan direction; and the second ink is ejected when the inkjet head is printing in the main scan direction after it moves by a distance of x/b in the sub-scan direction;

when a/b≤1, the inkjet head moves by a distance of x/b in the sub-scan direction which is perpendicular to the main scan direction after finishing each scan in the main scan direction; wherein the first ink is ejected when the inkjet head is printing in the main scan direction after it moves by a distance of x/a in the sub-scan direction; and the second ink is ejected when the inkjet head is printing in the main scan direction after it moves by a distance of x/b in the sub-scan direction.

In the preferred embodiment, an ink volume of the first ink printed onto the printing medium is less than that of the second ink.

In the preferred embodiment, when a=8 and b=4, the inkjet head moves by a distance of x/8 in the sub-scan direction which is perpendicular to the main scan direction after finishing each scan in the main scan direction. The first ink is ejected when the inkjet head is printing in the main scan direction after it moves by a distance of x/8 in the sub-scan direction; and the second ink is ejected when the inkjet head is printing in the main scan direction after it moves by a distance of x/4 in the sub-scan direction. That is to say, the first ink is ejected twice while the second ink is ejected once in every scan. And it also indicates that the ink volume of the first ink printed onto the printing medium is twice as that of the second ink. The inkjet head moves by a first preset distance in the sub-scan direction after finishing each scan in the main scan direction, wherein the first preset distance is equal to x/8, indicating that the inkjet head prints eight times in each unit area during the printing process. By this method, the volume of the white ink (the first ink is white ink) is increased in a short period of time, and as a result, not only the printed image is more delicate, but also the printing process gets a high efficiency. It is understandable that the first ink may also be other types of ink besides white ink, and the first preset distance can be set according to requirements, which is not specifically limited here. When a thickness of the first ink is accumulated to a preset value, the inkjet head is controlled to eject the second ink on the first ink and continue to print the first ink in a preset area that is not printed in the sub-scan direction.

In this printing process, when the first ink is accumulated to a preset thickness, the inkjet head not only prints the second ink on the first ink, but also prints the first ink in a preset area that is not printed in the sub-scan direction; the first ink and the second ink are ejected synchronously, so as to avoid problems of the multiple positioning and low efficiency caused by separate ejection of the first ink and the second ink in the prior art. In the preferred embodiment, the second ink is one or more of cyan ink (C), magenta ink (M), yellow ink (Y), and black ink (K). All the above-described steps are repeated for a preset number of times, so as to finish printing the preset image. Since the image is completed only by printing once, and there is no need for multiple positioning, the three-dimensional effect image can be printed efficiently and quickly.

In an embodiment, before repeating all the above-described steps to finish printing the preset image, the printing control method further comprises steps of: ejecting a third ink onto the first ink and the second ink, so as to cover the first ink and the second ink. Preferably, the third ink is UV varnish, which can make the printed product more beautiful and protect the first ink and the second ink.

In an embodiment, the first ink comprises white ink used for printing a substrate area and white ink used for printing an embossed area, the second ink is one or more of cyan ink, magenta ink, yellow ink and black ink, and the step of ejecting the first ink specifically comprises steps of:

dividing an inkjet unit of the printer into a first inkjet unit comprising one inkjet head and a second inkjet unit comprising at least one inkjet head;

wherein: the inkjet unit of the printer typically comprises a number of inkjet heads, and each inkjet head comprises a number of nozzles which can eject ink independently; therefore, the inkjet unit of the printer can be divided into a first inkjet unit comprising one inkjet head and a second inkjet unit comprising at least one inkjet head; the first inkjet unit and the second inkjet unit are independent to each other, and can perform different ink-ejecting tasks respectively;

receiving first data channel information and second data channel information that are imported directly by a user through a RIP software, or generated by the RIP software after processing the to-be-printed image;

wherein: after dividing the inkjet unit of the printer into a first inkjet unit and a second inkjet unit, the first data channel information is sent to the first inkjet unit, and the second data channel information is sent to the second inkjet unit, so as to control the first inkjet unit and the second inkjet unit to perform the ink-ejecting task; because the first data channel information and the second data channel information are generated according to the printing task input by the user, the first data channel information and the second data channel information, which are directly imported by the user through the RIP software or generated by the RIP software after processing the to-be-printed image, need to be received; that is to say, data channel information related to the printing task is received;

it should be noted that: if the printer itself stores information comprising the first data channel information and the second data channel information, after setting the first inkjet unit and the second inkjet unit, the stored information can be used to control the first inkjet unit and the second inkjet unit directly;

sending the first data channel information to the first inkjet unit, and controlling the first inkjet unit to print the white ink on the substrate area of the printing medium; sending the second data channel information to the second inkjet unit, and controlling the second inkjet unit to print the white ink on the embossed area of the printing medium.

In the preferred embodiment, the first data channel information comprises substrate area information of the to-be-printed image and concentration information of the white ink used for printing the substrate area, and the second data channel information comprises embossed area information of the to-be-printed image and concentration information of the white ink used for printing the embossed area. The first data channel information is sent to the first inkjet unit and the first inkjet unit is controlled to eject the white ink onto the substrate area of the printing medium according to the concentration information of the white used for printing the substrate area; the second data channel information is sent to the second inkjet unit and the second inkjet unit is controlled to eject the white ink onto the embossed area of the printing medium according to the concentration information of the white ink used for printing the embossed area.

In another embodiment, the first data channel information comprises the substrate area information of the to-be-printed image, the concentration information of the white ink used for printing the substrate area, the embossed area information of the to-be-printed image and the concentration information of the white ink used for printing the embossed area; the second data channel information comprises the embossed area information of the to-be-printed image and the concentration information of the white ink used for printing the embossed area. The first data channel information is sent to the first inkjet unit, and the first inkjet unit is controlled to eject the white ink onto the substrate area of the printing medium according to the concentration information of the white used for printing the substrate area as well as controlled to eject the white ink onto the embossed area of the printing medium according to the concentration information of the white ink used for printing the embossed area; the second data channel information is sent to the second inkjet unit, and the second inkjet unit is controlled to eject the white ink onto the embossed area of the printing medium according to the concentration information of the white ink used for printing the embossed area.

It can be seen from the above steps that: by setting the first inkjet unit and the second inkjet unit, and sending the first data channel information and the second data channel information corresponding to the first inkjet unit and the second inkjet unit to the first inkjet unit and the second inkjet unit, the white ink used for the substrate area and the white ink used for the embossed area are respectively printed on the substrate area and the embossed area of the printing medium, and therefore a three-dimensional effect image with clear layers and fine texture can be printed efficiently and quickly.

In another embodiment, the step of ejecting the first ink specifically comprises steps of:

dividing the inkjet unit of the printer into a first inkjet unit comprising one inkjet head, a second inkjet unit comprising at least one inkjet head, and a plurality of color inkjet units comprising at least one inkjet head respectively;

wherein: the color inkjet units comprise at least one of a cyan inkjet unit, a magenta inkjet unit, a yellow inkjet unit, and a black inkjet unit; the first inkjet unit, the second inkjet unit, and the plurality of color inkjet units are independent to each other, and can perform different ink-ejecting tasks respectively;

receiving the first data channel information, the second data channel information and color data channel information imported corresponding to each inkjet unit, which are imported directly by the user through the RIP software or generated by the RIP software after processing the to-be-printed image;

wherein: the color data channel information corresponding to each color inkjet unit comprises the substrate area information and/or embossed area information of the to-be-printed image and concentration information of color ink used for printing the substrate area and/or embossed area of the to-be-printed image; if the first data channel information, the second data channel information and the color data channel information corresponding to each color inkjet unit are already stored in the printer, this step is unnecessary.

sending the first data channel information to the first inkjet unit, and controlling the first inkjet unit to eject the white ink onto the substrate area of the printing medium; sending the second data channel information to the second inkjet unit, and controlling the second inkjet unit to eject the white ink onto the embossed area of the printing medium; sending the color data channel information to each color inkjet unit and controlling each color inkjet unit to eject the color ink onto the substrate area and/or the embossed area where the white ink is printed.

By setting the first inkjet unit, the second inkjet unit and the color inkjet unit, sending the first data channel information, the second data channel information and the data channel information of the color inkjet unit corresponding to the first inkjet unit, the second inkjet unit, and the color inkjet unit to the first inkjet unit, the second inkjet unit and each color inkjet unit, and controlling them to eject the white ink on the substrate area of the printing medium, eject the white ink on the embossed area of the printing medium, and eject the color ink on the substrate area and/or embossed area, a three-dimensional effect image with clear layers and fine texture can be printed efficiently and quickly, and the three-dimensional effect image is a colorful embossed image.

Embodiments of the Present Invention

Embodiment 1

Figure 4:
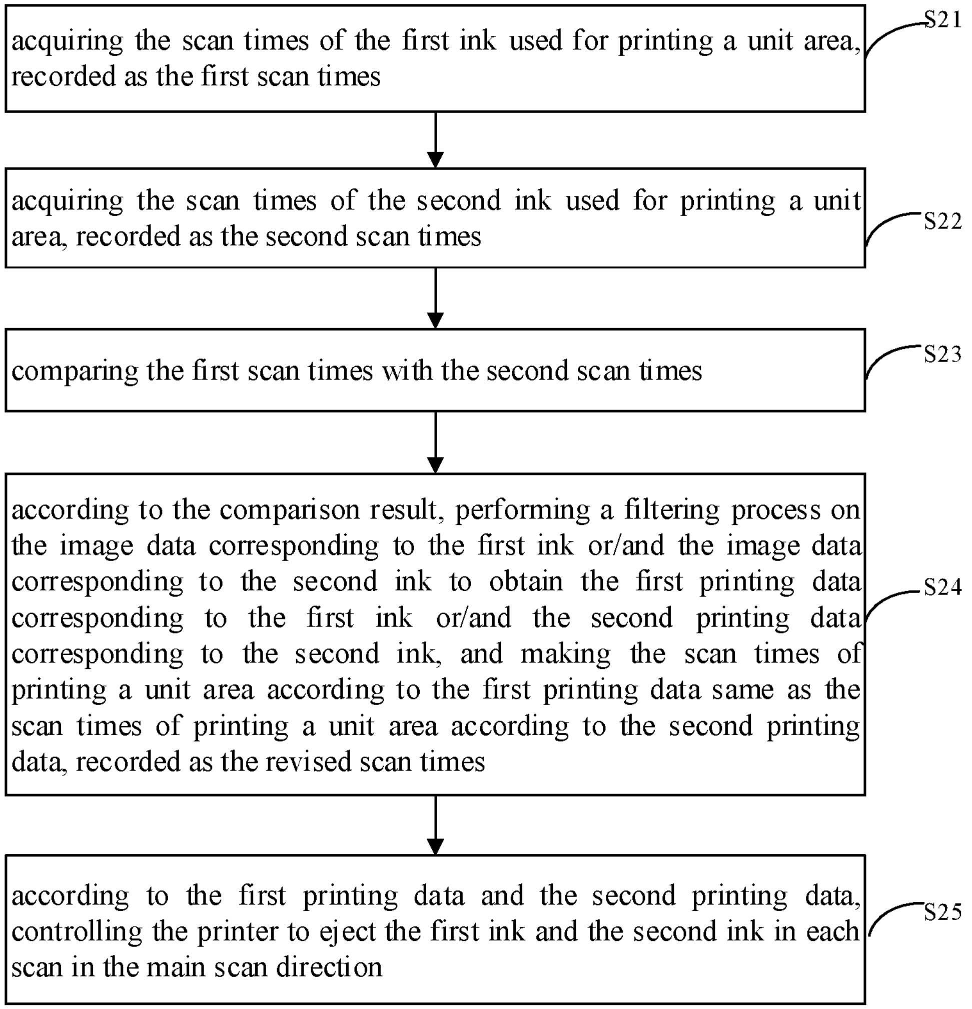
FIG. 4 is a flow chart of a printing control method according to an embodiment 1 of the present invention.

Referring to FIG. 4, in this embodiment, a printing data filtering process is added to the printing control method, so that the first ink and the second ink can be ejected at the same time to avoid clogging due to the failure of some nozzles. The printing control method comprises steps of:

(S21) acquiring the scan times of the first ink used for printing a unit area, recorded as the first scan times;

(S22) acquiring the scan times of the second ink used for printing a unit area, recorded as the second scan times;

(S23) comparing the first scan times with the second scan times;

(S24) according to the comparison result, performing a filtering process on the image data corresponding to the first ink or/and the image data corresponding to the second ink to obtain the first printing data corresponding to the first ink or/and the second printing data corresponding to the second ink, and making the scan times of printing a unit area according to the first printing data same as the scan times of printing a unit area according to the second printing data, recorded as the revised scan times; and (S25) according to the first printing data and the second printing data, controlling the printer to eject the first ink and the second ink in each scan in the main scan direction.

The first ink can be white ink, or one or more of cyan ink (C), magenta ink (M), yellow ink (Y), and black ink (K), which is not specifically limited here. The unit area can be 0.01 square millimeter or 0.1 square millimeter, etc., and its size can be set according to requirements, which is not specifically limited here. The scan times of the first ink are the ejecting times of the inkjet head of the printer in the unit area. The second ink can be white ink, or one or more of cyan ink (C), magenta ink (M), yellow ink (Y), and black ink (K), which is not specifically limited here. The comparison result may comprise: the first scan times are a multiple of the second scan times; the second scan times are a multiple of the first scan times; and the first scan times aren't a multiple of the second scan times and vice versa.

In this embodiment, the first ink is white ink and used for achieving the embossed effect of the color images. The second ink comprises cyan ink (C), magenta ink (M), yellow ink (Y), and black ink (K), and the ejecting times of these four ink are the same.

The value of the first scan times is set to "a", and the value of the second scan times is set to "b", wherein $a \geq 1$, $b \geq 1$, $n \geq 1$, a, b and n are integers; when $a=nb$, the value of the first scan times is larger; in order to make the first scan times same as the second scan times, the image data corresponding to the second ink are adjusted through performing the filtering process. According to the comparison result, the filtering process is performed on the image data corresponding to the second ink to obtain the second printing data corresponding to the second ink, and the image data corresponding to the first ink are recorded as the first printing data without any adjustments, so as to make the first scan times same as the revised scan times of the second ink.

When $b=na$, the value of the second scan times is larger; in order to make the first scan times same as the second scan times, the image data corresponding to the first ink are adjusted through performing the filtering process. According to the comparison result, the filtering process is performed on the image data corresponding to the first ink to obtain the first printing data corresponding to the first ink, and the image data corresponding to the second ink are recorded as the second printing data without any adjustments, so as to make the revised scan times of the first ink same as the second scan times.

When $a \neq nb$ and $b \neq ma$, the first scan times aren't the multiple of the second scan times and vice versa. Therefore, it's necessary to obtain the common multiple of the first scan times and the second scan times, so as to make the revised scan times of the first ink equal to that of the second ink. And then, according to the common multiple, the filtering process is performed on the image data corresponding to the first ink and the second ink respectively, so as to make the revised scan times of the first ink same as the revised scan times of the second ink; the specific operation is to perform a filtering process, namely the image data corresponding to the first ink and the second ink are subjected to the filtering process according to the comparison result to obtain the first printing data corresponding to the first ink and the second printing data corresponding to the second ink, respectively, so as to make the revised scan times of the first ink same as the revised scan times of the second ink.

For example, under a condition that $a=nb$, when $a=8$, $b=4$, the value of the second scan times is smaller than that of the first scan time, and the first scan times are 2 times as the second scan times. According to the comparison result of 2, the filtering data after performing the filtering process on the image data corresponding to the second ink are obtained. An AND operation is performed on the image data corresponding to the second ink with the filtering data so that the image data corresponding to the second ink is "diluted", and then it's necessary to increase the printing times to ensure the printing precision. The filtering process makes the image data corresponding to the second ink "diluted" to half of the original ones, so the revised scan times of the second ink are equal to the first scan times, and are two times as the second scan times, namely the revised scan times of the second ink are 8. The data participating in the AND operation are binary number, and the rule of the AND operation is: 0&0=0; 0&1=0; 1&0=0; 1&1=1; that is to say: only when both the data are "1", the result is "1", otherwise it is "0". In this embodiment, when the image data of a certain pixel are an ink discharging data of "1", if the corresponding filtering data are also the ink discharging data of "1", the pixel discharges ink; if the corresponding filtering data are an ink holding data of "0", the pixel does not discharge ink. The above numerical values of a, b, and c are only a case for explaining this embodiment, and the numerical values of a, b, and c are not limited to the numerical values in this embodiment. Any number that meets the conditions of this embodiment meets the requirements of the present invention.

Figure 5:
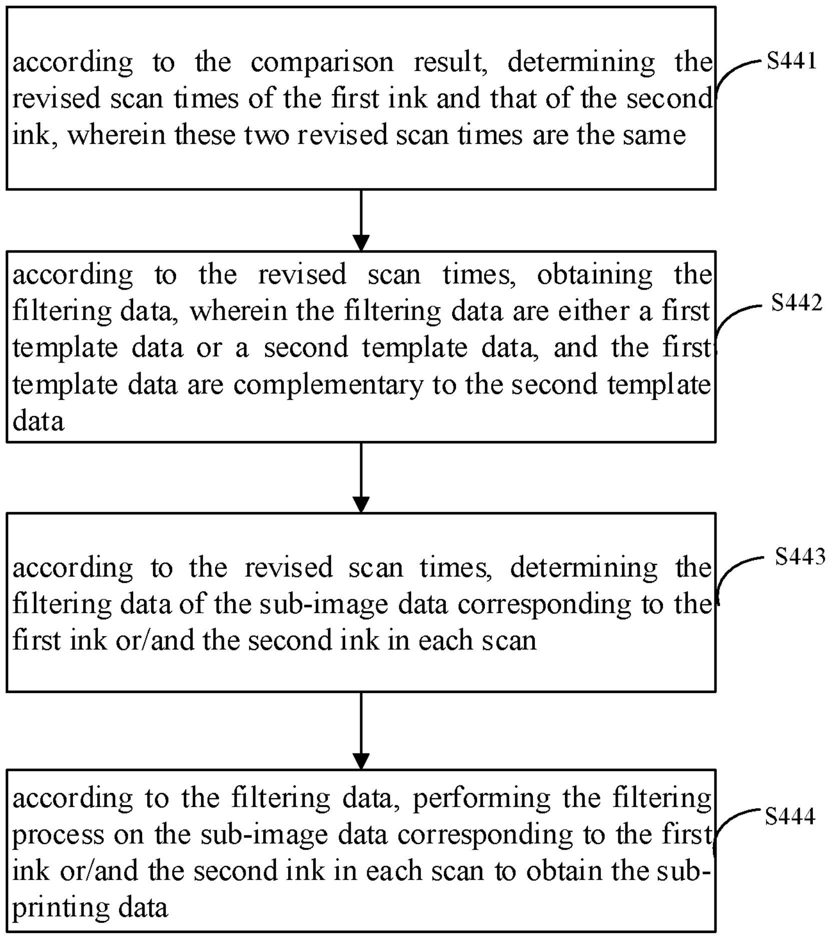
FIG. 5 is another flow chart of the printing control method according to the embodiment 1 of the present invention.

Referring to FIG. 5, the filtering process comprises steps of:

(S441) according to the comparison result, determining the revised scan times of the first ink and that of the second ink, wherein these two revised scan times are the same;

(S442) according to the revised scan times, obtaining the filtering data, wherein the filtering data are either a first template data or a second template data, and the first template data are complementary to the second template data;

wherein: in this embodiment, the value of the first scan times is set to "a", and the value of the second scan times is set to "b", a≥1, b≥1, n≥1, a, b and n are integers; when a=nb (the value of the second scan times is smaller than the value of the first scan times), the filtering process is performed on the image data corresponding to the second ink to make the scan times of printing a unit area according to the second ink equal to the scan times of printing a unit area according to the first ink; that is to say, after performing the filtering process, the value of the revised scan times of the second ink is "a", and the value of the revised scan times of the first ink is also "a"; the image data corresponding to the first ink are recorded without any adjustments, while the image data corresponding to the second ink are diluted by n times to determine the filtering data corresponding to the image data of the second ink;

when b=na (the value of the first scan times is smaller than the value of the second scan times), the filtering process is performed on the image data corresponding to the first ink to make the scan times of printing a unit area according to the first ink equal to the scan times of printing a unit area according to the second ink; that is to say, after performing the filtering process, the value of the revised scan times of the first ink is "b", and the value of the revised scan times of the second ink is also "b"; the image data corresponding to the second ink are recorded without any adjustments, while the image data corresponding to the first ink are diluted by n times to determine the filtering data corresponding to the image data of the first ink;

when a≠nb and b≠ma, the first scan times aren't the multiple of the second scan times and vice versa; therefore, it's necessary to obtain the common multiple of the first scan times and the second scan times; according to the common multiple, the filtering data of the image data corresponding to the first ink and that of the second ink are determined to make the revised scan times of the first ink equal to the revised scan times of the second ink;

the filtering data are either the first template data or the second template data, and the first template data are complementary to the second template data; it is supposed that the first template data are $f^1_{pq}$, the second template data are $f^2_{pq}$, so $f^1_{pq}+f^2_{pq}=F_{pq}$, wherein $F_{pq}$ is a matrix of "1":

$$F_{pq}=\begin{bmatrix}1 & 1 & \cdots & 1 & 1\\ 1 & 1 & \cdots & 1 & 1\\ \vdots & \vdots & \ddots & \vdots & \vdots\\ 1 & 1 & \cdots & 1 & 1\\ 1 & 1 & \cdots & 1 & 1\end{bmatrix};$$

(S443) according to the revised scan times, determining the filtering data of the sub-image data corresponding to the first ink or/and the second ink in each scan;

wherein: whether the first template data or the second template data are performed with an AND operation with the sub-image data corresponding to each scan is determined;

for example, when a=8, b=4, the filtering process is performed on the image data corresponding to the second ink; when printing in a certain area, the AND operation is performed between the first template data and the first sub-image data corresponding to the second ink in the first scan, the first template data and the second sub-image data corresponding to the second ink in the second scan, the first template data and the third sub-image data corresponding to the second ink in the third scan, the first template data and the fourth sub-image data corresponding to the second ink in the fourth scan respectively; the AND operation is performed between the second template data and the fifth sub-image data corresponding to the second ink in the fifth scan, the second template data and the sixth sub-image data corresponding to the second ink in the sixth scan, the second template data and the seventh sub-image data corresponding to the second ink in the seventh scan, the second template data and the eighth sub-image data corresponding to the second ink in the eighth scan respectively;

(S444) according to the filtering data, performing the filtering process on the sub-image data corresponding to the first ink or/and the second ink in each scan to obtain the sub-printing data.

The image data comprise a plurality of sub-image data, the first printing data and the second printing data respectively comprise a plurality of sub-printing data, a piece of sub-printing data corresponds to a scan of the inkjet head in the main scan direction, and a piece of sub-printing data also corresponds to a piece of sub-image data.

Figure 6:
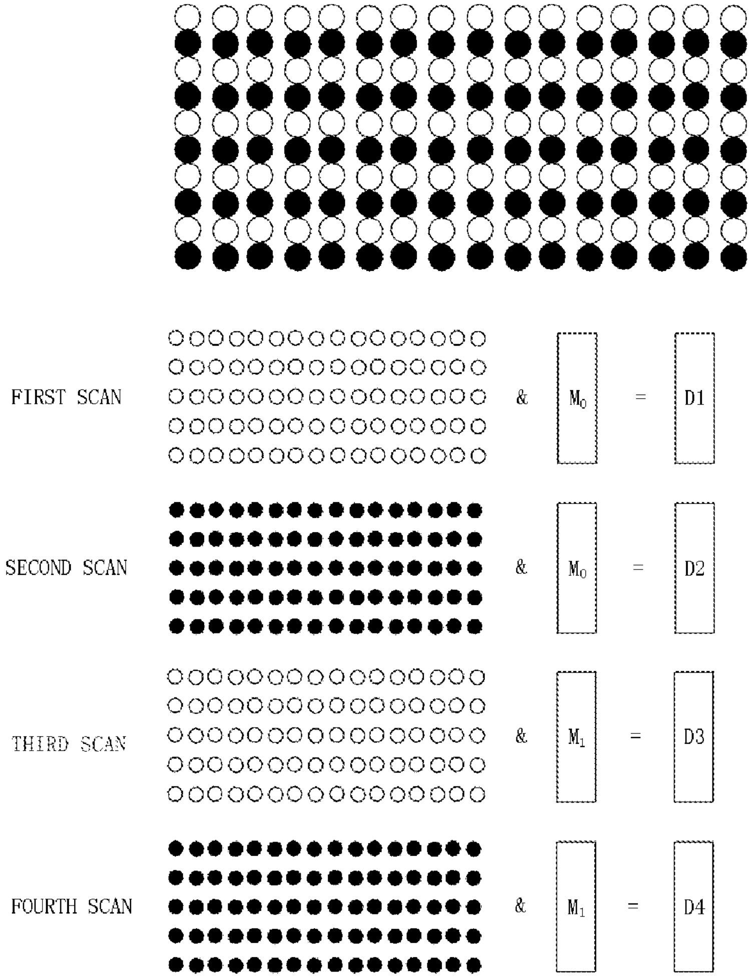
FIG. 6 is a schematic view showing a data filtering process of the printing control method according to the embodiment 1 of the present invention.

Referring to FIG. 6, in this embodiment, the value of the first scan times is 4, and the value of the second scan times is 2, according to the comparison result, the filtering process is performed on the image data corresponding to the second ink to make the revised scan times of the second ink same as the first scan times, equal to 4. Therefore, when printing a certain area, the AND operation is performed between the first sub-image data corresponding to the second ink and the first template data $M_0$ in the first scan to obtain the first sub-printing data D1, the AND operation is performed between the second sub-image data corresponding to the second ink and the first template data $M_0$ in the second scan to obtain the second sub-printing data D2, the AND operation is performed between the third sub-image data corresponding to the second ink and the first template data $M_0$ in the third scan to obtain the third sub-printing data D3, and the AND operation is performed between the fourth sub-image data corresponding to the second ink and the first template data $M_0$ in the fourth scan to obtain the fourth sub-printing data D4, wherein D1 is complementary to D3, and D2 is complementary to D4.

Figure 7:
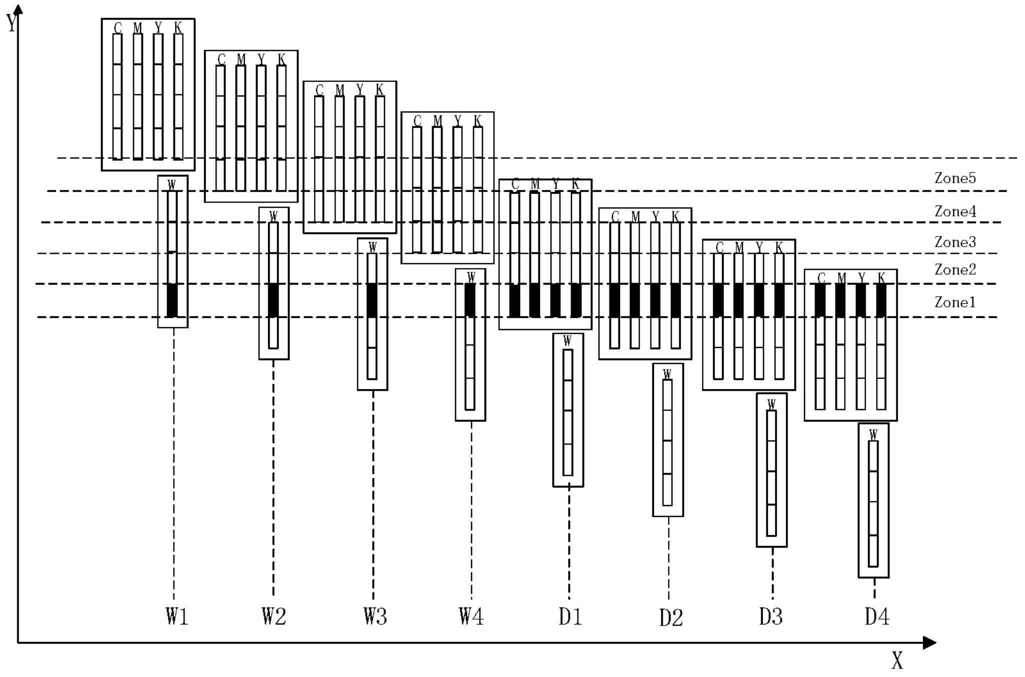
FIG. 7 is a schematic view showing a printing process of the printing control method according to the embodiment 1 of the present invention.

Referring to FIG. 7, the main scan direction of the printer is the direction of the X-axis, the sub-scan direction of the printer is the direction of the Y-axis, the sub-scan direction is perpendicular to the main scan direction, and the printer comprises the first inkjet head unit and the second inkjet head unit. The first ink is ejected by the first inkjet head unit and the second ink is ejected by the second inkjet head unit. The first ink is white ink (W), and the second ink comprises cyan ink (C), magenta ink (M), yellow ink (Y), and black ink (K). The printing process of printing the image data in FIG. 6 is shown in FIG. 7. In this embodiment, the white ink is used for printing the substrate area. The process that the inkjet head has scanned once in the main scan direction is called 1 pass; after the printing area Zone1 has been printed by using the first ink (the white ink W) in 4 pass (W1~W4), it is printed by using the second ink in 4 pass with the following printing order: printing the first sub-printing data D1, the second sub-printing data D2, the third sub-printing data D3, and the fourth sub-printing data D4. The printing processes of other areas of Zone2~Zone5 are the same as that of Zone1 and not repeated herein. As shown in FIG. 7, the inkjet heads are ejecting ink in every scan, wherein: in the first scan, the printing area Zone1 is covered by the white ink once, while the printing area Zone2 has been covered by the white ink for the second time, the printing area Zone3 for the third time, the printing area Zone4 for the fourth time, and the printing area Zone5 has finished the white ink covering and has been printed by the second ink. The first ink and the second ink are ejected at the same time in each scan, thereby avoiding the problem of nozzle clogging and image mottling. The first ink also can be the white ink used for printing the embossed area, and the concentration of the white ink can be set according to the printing application.

Furthermore, the value of the revised scan times is set to "c"; according to the first printing data and the second printing data, the printer is controlled to eject the first ink and the second ink in each scan in the main scan direction and then move by a distance of 1/c of the end-face-length in the sub-scan direction. Referring to FIG. 7, the value of the revised scan times is 4, the printer is controlled to eject the first ink and the second ink in each scan in the main scan direction and then relatively move by a distance of ¼ of the end-face-length in the sub-scan direction, wherein "relatively move" refers to the movement which can be done by the inkjet head, such as in a UV flatbed printer, or by the printing medium, such as in a roll printer or a photo printer.

Embodiment 2

Figure 8:
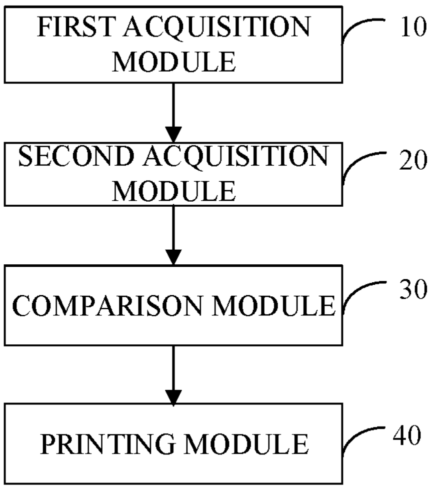
FIG. 8 is a schematic view of a printing control device according to an embodiment 2 of the present invention.

Referring to FIG. 8, the present invention further provides a printing control device, comprising:

- a first acquisition module 10 configured for acquiring the first scan times of the first ink used for printing a unit area;
- a second acquisition module 20 configured for acquiring the second scan times of the second ink used for printing a unit area;
- a comparison module 30 configured for comparing the first scan times with the second scan times; and
- a printing module 40 configured for according to the comparison result, controlling the printer to eject the first ink or/and the second ink in each scan in the main scan direction.

Embodiment 3

Figure 9:
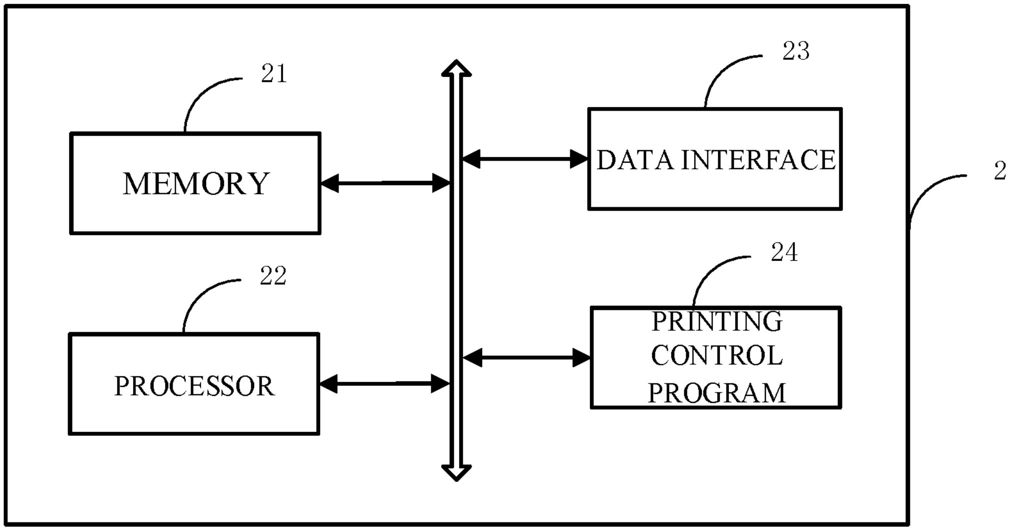
FIG. 9 is a schematic view of a hardware architecture of a printing control device according to an embodiment 3 of the present invention.

Referring to FIG. 9, the present invention further provides a printing control device 2, comprising: a memory 21, a processor 22, and a data interface 23, which are connected through a system bus or other ways and intercommunicated. Computer program instructions are stored in the memory 21. When the computer program instructions are executed by the processor 22, the printing control method is implemented through steps of:

- acquiring first scan times of the first ink used for printing a unit area;
- acquiring second scan times of the second ink used for printing a unit area;
- comparing the first scan times with the second scan times; and
- according to the comparison result, controlling the printer to eject the first ink or/and the second ink in each scan in main scan direction.

In an embodiment, when the computer program instruction is executed by the processor, the implemented printing control method further comprises steps of:

- setting the value of the first scan times to "a", and setting the value of the second scan times to "b", wherein a, b∈$2^n$, n is a natural number, and the length of the end face on which the nozzles of the inkjet head are located is "x";
- when a=b, ejecting the first ink and the second ink at the same time in each ink-ejecting process, and then moving the inkjet head by a distance of x/a relative to the printing medium.

In an embodiment, when the computer program instruction is executed by the processor, the implemented printing control method further comprises steps of:

- setting the value of the first scan times to "a", and setting the value of the second scan times to "b", wherein a, b∈$2^n$, n is a natural number, and the length of the end face on which the nozzles of the inkjet head are located is "x";
- when a≠1 or b≠1, and a/b≥1, moving the inkjet head by a distance of x/a in the sub-scan direction which is perpendicular to the main scan direction after finishing each scan in the main scan direction; ejecting the first ink when the inkjet head is printing in the main scan direction after it moves by a distance of x/a in the sub-scan direction; and,
- ejecting the second ink when the inkjet head is printing in the main scan direction after it moves by a distance of x/b in the sub-scan direction.

In an embodiment, when the computer program instruction is executed by the processor, the implemented printing control method further comprises steps of:

- setting the value of the first scan times to "a", and setting the value of the second scan times to "b", wherein a, b∈$2^n$, and n is a natural number, and the length of the end face on which the nozzles of the inkjet head are located is "x";
- when a/b<1, moving the inkjet head by a distance of x/b in the sub-scan direction which is perpendicular to the main scan direction after finishing each scan in the main scan direction; ejecting the first ink when the inkjet head is printing in the main scan direction after it moves by a distance of x/a in the sub-scan direction; and,
- ejecting the second ink when the inkjet head is printing in the main scan direction after it moves by a distance of x/b in the sub-scan direction.

In an embodiment, the first ink comprises the white ink used for printing the substrate area and the white ink used for printing the embossed area, and the second ink is one or more of the cyan ink, magenta ink, yellow ink and black ink.

The printing control device 2 can be an independent electronic device that realizes a specific function by being connected with other electronic devices, or can be a component or unit of other electronic devices that realizes a specific function.

The memory 21 comprises at least one type of the readable storage medium, and the readable storage medium comprises flash memory, hard disk, multimedia card, card-type memory (for example, SD or DX memory, etc.), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disks, optical disks, etc.

In this embodiment, the memory 21 is generally used for storing the data of the operating system and various application software which is installed in the printing control device 2, for example, the program code of the printing control program 24, etc., wherein the program code is used for implementing the above-described method. In addition, the memory 21 can also be used for temporarily storing various types of data that have been output or will be output.

The processor 22 may be a Central Processing Unit (CPU), a controller, a microcontroller, a microprocessor, or other data processing chips in some embodiments. The processor 22 is generally used for controlling the overall operation of the printing control device 2, such as performing data interaction or communication-related control and processing. In this embodiment, the processor 22 is used for running the program code or processing data stored in the memory 21, for example, running the printing control program 24.

The data interface 23 may comprise a wireless data interface or a wired data interface, and the data interface 23 is generally used for establishing a communication connection between the printing control device 2 and other electronic devices. In this embodiment, the printing control device 2 is connected to a printer or a network printer (not shown in FIG. 9) through the data interface 23 to exchange information, and can perform corresponding operations to control the printer or network printer through the data interface 23.

Figure 10:
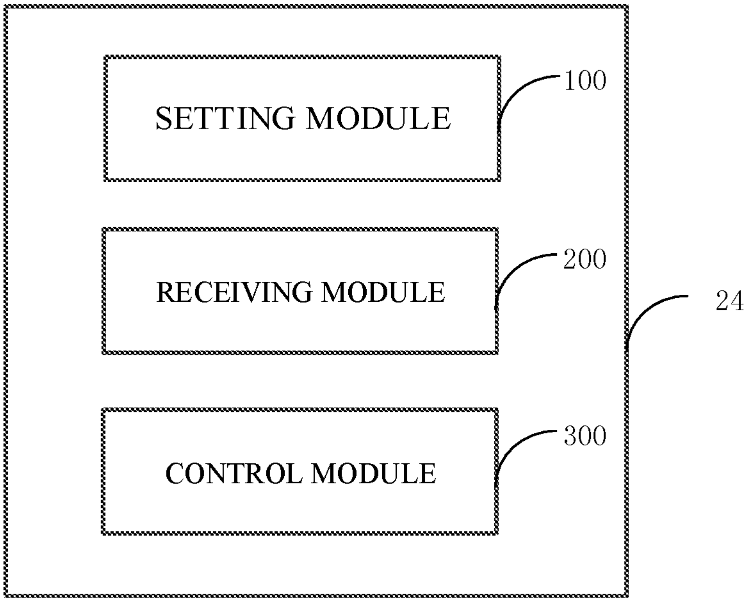
FIG. 10 is a block diagram of a printing control program according to the embodiment 3 of the present invention.

Referring to FIG. 10, a block diagram of the printing control program 24 of the present invention is shown.

In this embodiment, the printing control program 24 is divided into one or more modules, and these modules are stored in the memory 21 and are executed by one or more processors (namely the processor 22 in this embodiment) to complete the present invention. For example, as shown in FIG. 10, the printing control program 24 can be divided into a setting module 100, a receiving module 200, and a control module 300. The program module described in the present invention refers to a series of computer program instruction segments capable of completing specific functions, and is more suitable than a program to describe the execution process of the printing control program 24 in the printing control device 2. The function of each program module will be described in details as follows.

The setting module 100 is configured for dividing the inkjet unit of the printer to a first inkjet unit comprising one inkjet head and a second inkjet unit comprising at least one inkjet head.

Specifically, since the inkjet unit of the printer usually comprises a number of inkjet heads, and each inkjet head comprises a large number of nozzles, each nozzle can perform independent ink-ejecting operations. Therefore, by the setting module 100, the inkjet unit of the printer is divided into the first inkjet unit comprising one inkjet head and the second inkjet unit comprising at least one inkjet head, wherein the first inkjet unit and the second inkjet unit are independent to each other and can perform different ink-ejecting tasks respectively.

In this embodiment, when a three-dimensional effect image with a substrate area and an embossed area is printed on the printing medium, because the concentration of the white ink used for printing the substrate area is low, and the density of ink dots is small, if multiple inkjet heads are used simultaneously to print the substrate area, due to the distance between the inkjet heads, it is easy to make the ink dots gather in the place corresponding to the intersection of the inkjet heads, and large blanks appear in the places corresponding to the large gaps between the inkjet heads. Thus, the printed image would be grainy and rough. Therefore, the first inkjet unit comprising one inkjet head is used to eject the white ink onto the substrate alone and print the substrate area with uniformly distributed white ink of the same concentration. Moreover, the second inkjet unit comprising multiple inkjet heads can be used for printing the embossed area superimposed with high-concentration white ink efficiently and quickly, without affecting the printing effect.

The receiving module 200 is configured to receive the first data channel information and the second data channel information imported directly by the user through the RIP software, or generated by the RIP software after processing the to-be-printed image.

In an embodiment, the printing control device 2 sends control information comprising data channel information to the printer through the data interface 23 to control the printer to perform ink-ejecting tasks. After the inkjet unit of the printer is divided into the first inkjet unit and the second inkjet unit by the setting module 100, the printing control device 2 sends the first data channel information and the second data channel information which are used for controlling the first inkjet unit and the second inkjet unit to eject ink to the printer. Since the first data channel information and the second data channel information are generated according to specific printing tasks, the receiving module 200 first receives the first data channel information and the second data channel information which are imported directly by the user through the RIP software, or generated by the RIP software after processing the to-be-printed image.

In this embodiment, the substrate area with white ink is printed by the first inkjet unit and the embossed area with white ink is printed by the second inkjet unit, wherein the first channel data information comprises the substrate area information of the to-be-printed image and the concentration information of the white ink used for printing the substrate area, and the second data channel information comprises the embossed area information of the to-be-printed image and the concentration information of the white ink used for printing the embossed area. This information received by the receiving module 200 is imported directly by the user through the RIP software, or generated by the RIP software after processing the to-be-printed image.

It should be noted that: the first data channel information and the second data channel information are set by the printing task and are changeable. In yet another embodiment, when it needs to print the substrate area and the embossed area with the white ink of low concentration, and then print the embossed area with white ink of high concentration, the first data channel information is required to comprise the substrate area information and the embossed area information of the to-be-printed image, as well as the concentration information of the white ink used for printing the substrate area. For another example, because the inkjet head of the first inkjet unit has the same number of nozzles with that of the second inkjet unit, when the substrate area is printed with low-concentration white ink by the first inkjet unit, there are lots of nozzles underused; if all of the nozzles in the first inkjet are used, the embossed area could be printed with high-concentration white ink. Therefore, in order to improve the printing efficiency, the first data channel information has to comprise the substrate area information of the to-be-printed image and the concentration information of the white ink used for printing the substrate area, as well as the embossed area information of the to-be-printed image and the concentration information of the white ink used for printing the embossed area. When the first inkjet unit is positioned above the substrate area of the printing medium, this area is printed according to the first data channel information comprising the substrate area information of the to-be-printed image and the concentration information of the white ink used for printing the substrate area; when the first inkjet unit is positioned above the embossed area of the printing medium, this area is printed according to the first data channel information comprising the embossed area information of the to-be-printed image and the concentration of the white ink used for printing the embossed area.

In yet another embodiment, the first data channel information and the second data channel information are already stored in the printing control device 2; after the first inkjet unit and the second inkjet unit are set, the stored first data channel information and second data channel information can be directly used by the printing control device 2 to control the first inkjet unit and the second inkjet unit to eject ink. Therefore, the receiving module 200 is not necessary.

The control module 300 is configured to send the first data channel information to the first inkjet unit and control the first inkjet unit to eject the white ink onto the substrate area of the printing medium; meanwhile, the control module 300 sends the second data channel information to the second inkjet unit and controls the second inkjet unit to eject white ink onto the embossed area of the printing medium.

In this embodiment, the control module 300 sends the first data channel information comprising the substrate area information of the to-be-printed image and concentration information of the white ink used for printing the substrate area to the first inkjet unit and controls the first inkjet unit to eject low-concentration white ink onto the substrate area of the printing medium. The control module 300 also sends the second data channel information comprising the embossed area information of the to-be-printed image and the concentration information of the white ink used for printing the embossed area to the second inkjet unit and controls the second inkjet unit to eject high-concentration white ink onto the embossed area of the printing medium.

In the printing control program 24, the first inkjet unit and the second inkjet unit are set by the setting unit 100, and the data received by the receiving module 200 is sent by the control module 300 to the first inkjet unit and the second inkjet unit, wherein the data comprise the first data channel information corresponding to the first inkjet unit and the second data channel information corresponding to the second inkjet unit. According to this information, the control module 300 controls the first inkjet unit and the second inkjet to respectively eject white ink onto the substrate area and the embossed area of the printing medium. Therefore, three-dimensional effect images with clear layers and fine texture can be printed out efficiently and quickly. The three-dimensional effect images are certainly white embossed images.

In yet another embodiment, in order to print out a three-dimensional color embossed image with a clear layer and fine texture efficiently and quickly, the setting module 100, the receiving module 200 and the control module 300 need to achieve the following functions.

The setting module 100 is also configured to divide the inkjet unit of the printer into a plurality of color inkjet units, and each color inkjet unit comprises at least one inkjet head.

Specifically, the plurality of color inkjet units comprise at least one of cyan inkjet unit, magenta inkjet unit, yellow inkjet unit and black inkjet unit, which are set according to the color of the image to be printed. When the colors of the to-be-printed image are black and cyan, a cyan inkjet unit and a black inkjet unit, comprising at least one inkjet head, need to be set by the setting module 100.

The receiving module 200 is configured to receive the data channel information of each color inkjet unit imported directly by the user through the RIP software, or generated by the RIP software after processing the to-be-printed image.

Specifically, color data channel information corresponding to each color inkjet unit comprises printing area information and the concentration information of the color ink. Similarly, in this embodiment, the color data channel information of each color inkjet unit received by the receiving module 200 is imported directly by the user through the RIP software, or generated by the RIP software after processing the to-be-printed image. In yet another embodiment, when the color data channel information corresponding to each color inkjet unit is stored in the printing control device 2, the receiving module 200 is not necessary.

The control module 300 is also configured to send the color data channel information to the corresponding color inkjet unit, and control the color inkjet unit to eject color ink onto the substrate area and/or embossed area covered with white ink.

Specifically, when there are multiple color inkjet units, the control module 300 needs to send the color data channel information to the corresponding color inkjet unit, and control the color inkjet unit to eject color ink onto the substrate area and/or embossed area covered with white ink. Whether the color inkjet unit ejects ink or not is determined by the color data channel information corresponding to the color inkjet unit, wherein the color data channel information is determined by the color distribution of the image to be printed. In this embodiment, when the substrate area of the to-be-printed image is black and the embossed area is cyan, the plurality of color inkjet units comprise a cyan inkjet unit and a black inkjet unit. The color data channel information corresponding to the cyan inkjet unit comprises the embossed area information and the concentration information of the cyan ink, and the color data channel information corresponding to the black inkjet unit comprises the substrate area information and concentration information of the black ink. In order to get a printed color image, the control module 300 controls the cyan inkjet unit to eject cyan ink onto the embossed area covered with white ink, and controls the black inkjet unit to eject black ink onto the substrate area covered with white ink.

Embodiment 4

The present invention further provides a printer, comprising an ink cartridge; an inkjet head; a printing control device which is described above for controlling the inkjet head to perform the inkjet printing.

Embodiment 5

The present invention also provides a computer-readable storage medium, wherein the storage medium stores the printing control program 24 described above; the printing control program 24 can be executed by a processor to realize the functions of the setting module 100, the receiving module 200, and the control module 300.

INDUSTRIAL UTILITY

According to the printing control method, the printing control device and the storage medium provided in the present invention, by controlling the printer to eject first ink or/and second ink in each scan in the main scan direction according to the comparison result of the first scan times and the second scan times, the whole preset image is printed. Since the image is completed only by printing once and there is no need for multiple positioning, the three-dimensional effect image can be printed efficiently and quickly.

The above embodiments are only for illustrating the present invention, not for limiting the present invention. Although the present invention is described in detail with the preferred embodiment, one of ordinary skill in the art should understand that various modifications or equivalent replacements can be made without departing from the spirit and scope of the present invention.

What is claimed is:

1. A printing control method, comprising steps of:

acquiring first scan times, which is printing times of shuttle scan when an inkjet head ejects first ink to print a unit area on a printing medium;

acquiring second scan times, which is printing times of shuttle scan when the inkjet head ejects second ink to print another unit area on the printing medium;

comparing the first scan times with the second scan times; and, according to a comparison result, controlling a printer to eject the first ink or/and the second ink in each scan in a main scan direction, which comprises:

according to the comparison result, performing a filtering process on image data corresponding to the first ink or/and image data corresponding to the second ink to obtain first printing data corresponding to the first ink and second printing data corresponding to the second ink, and making scan times of printing the unit area according to the first printing data same as scan times of printing the another unit area according to the second printing data; and according to the first printing data and the second printing data, controlling the printer to eject the first ink and the second ink in the each scan in the main scan direction, wherein one of the first ink and the second ink is white ink.

2. The method, as recited in claim 1, further comprising steps of: setting a value of the first scan times to "a", and setting a value of the second scan times to "b", wherein a, b∈$2^n$, n is a natural number, and a length of an end face on which nozzles of an inkjet head are located is "x";

when a=b, ejecting the first ink and the second ink at the same time in each ink-ejecting process, and then moving the inkjet head by a distance of x/a relative to a printing medium.

3. The method, as recited in claim 1, further comprising steps of: setting a value of the first scan times to "a", and setting a value of the second scan times to "b", wherein a, b∈$2^n$, n is a natural number, and a length of an end face on which nozzles of an inkjet head are located is "x";

when a≠1 or b≠1, and a/b≥1, moving the inkjet head by a distance of x/a in a sub-scan direction which is perpendicular to the main scan direction after finishing each scan in the main scan direction; ejecting the first ink when the inkjet head is printing in the main scan direction after it moves by a distance of x/a in the sub-scan direction; and, ejecting the second ink when the inkjet head is printing in the main scan direction after it moves by a distance of x/b in the sub-scan direction.

4. The method, as recited in claim 1, further comprising steps of: setting a value of the first scan times to "a", and setting a value of the second scan times to "b", wherein a, b∈$2^n$, n is a natural number, and a length of an end face on which nozzles of an inkjet head are located is "x";

when a/b<1, moving the inkjet head by a distance of x/b in a sub-scan direction which is perpendicular to the main scan direction after finishing each scan in the main scan direction; ejecting the first ink when the inkjet head is printing in the main scan direction after it moves by a distance of x/a in the sub-scan direction; and, ejecting the second ink when the inkjet head is printing in the main scan direction after it moves by a distance of x/b in the sub-scan direction.

5. The method, as recited in claim 1, wherein: a value of the first scan times is set to "a", and a value of the second scan times is set to "b", wherein a≥1, b≥1, n>1, a, b and n are integers; when a=nb, the step of "according to the comparison result, performing a filtering process on image data corresponding to the first ink or/and image data corresponding to the second ink to obtain first printing data corresponding to the first ink and second printing data corresponding to the second ink, and making scan times of printing a unit area according to the first printing data same as scan times of printing a unit area according to the second printing data" specifically comprises steps of:

according to the comparison result, performing the filtering process on the image data corresponding to the second ink to obtain the second printing data corresponding to the second ink; and recording the image data corresponding to the first ink as the first printing data without any adjustments, so as to make the scan times of printing a unit area according to the first printing data same as the scan times of printing a unit area according to the second printing data.

6. The method, as recited in claim 1, wherein: a value of the first scan times is set to "a", and a value of the second scan times is set to "b", wherein a≥1, b≥1, n>1, a, b and n are integers; when b=na, the step of "according to the comparison result, performing a filtering process on image data corresponding to the first ink or/and image data corresponding to the second ink to obtain first printing data corresponding to the first ink and second printing data corresponding to the second ink, and making scan times of printing a unit area according to the first printing data same as scan times of printing a unit area according to the second printing data" specifically comprises steps of:

according to the comparison result, performing the filtering process on the image data corresponding to the first ink to obtain the first printing data corresponding to the first ink; and recording the image data corresponding to the second ink as the second printing data without any adjustments, so as to make the scan times of printing a unit area according to the first printing data same as the scan times of printing a unit area according to the second printing data.

7. The method, as recited in claim 1, wherein: a value of the first scan times is set to "a", and a value of the second scan times is set to "b", wherein a≥1, b≥1, n≥1 and m≥1, a, b, n and m are integers; when a≠nb and b≠ma, the step of "according to the comparison result, performing a filtering process on image data corresponding to the first ink or/and image data corresponding to the second ink to obtain first printing data corresponding to the first ink and second printing data corresponding to the second ink, and making scan times of printing a unit area according to the first printing data same as scan times of printing a unit area according to the second printing data" specifically comprises steps of:

according to the comparison result, performing the filtering process on the image data corresponding to the first ink and the image data corresponding to the second ink to obtain respectively the first printing data corresponding to the first ink and the second printing data corresponding to the second ink, and making the scan times of printing a unit area according to the first printing data same as the scan times of printing a unit area according to the second printing data.

8. The method, as recited in claim 1, wherein both the scan times of printing a unit area according to the first printing data and the scan times of printing a unit area according to the second printing data are set to "c", and a length of an end face on which nozzles of an inkjet head are located is "x"; the step of "according to the first printing data and the second printing data, controlling the printer to eject the first ink and the second ink in each scan in the main scan direction" specifically comprises steps of:

according to the first printing data and the second printing data, controlling the printer to eject the first ink and the second ink in each scan in the main scan direction and then move by a distance of x/c in a sub-scan direction.

9. The method, as recited in claim 8, wherein the image data comprise a plurality of sub-image data; the first printing data and the second printing data respectively comprise a plurality of sub-printing data; a piece of sub-printing data corresponds to one scan of the inkjet head in the main scan direction, and a piece of sub-printing data also corresponds to a piece of sub-image data.

10. The method, as recited in claim 9, wherein the step of "according to the comparison result, performing a filtering process on image data corresponding to the first ink or/and image data corresponding to the second ink to obtain first printing data corresponding to the first ink and second printing data corresponding to the second ink, and making scan times of printing a unit area according to the first printing data same as scan times of printing a unit area according to the second printing data" specifically comprises steps of:

determining whether the scan times of printing a unit area according to the first printing data and the scan times of printing a unit area according to the second printing data are the same or not, and acquiring revised scan times according to the comparison result;

acquiring filtering data according to the revised scan times, wherein the filtering data are either first template data or second template data, and the first template data are complementary to the second template data;

according to the revised scan times, acquiring the filtering data which are determined by the filtering process performed on the sub-image data corresponding to the first ink or/and the second ink in each scan; and, according to the filtering data, acquiring the sub-printing data by performing the filtering process on the sub-image data corresponding to the first ink or/and the second ink in each scan.

11. The method, as recited in claim 1, wherein the first ink comprises white ink used for printing a substrate area and white ink used for printing an embossed area, and the second ink is one or more of cyan ink, magenta ink, yellow ink and black ink; the first ink is ejected through steps of:

sending first data channel information to a first inkjet unit of an inkjet head, and controlling the first inkjet unit to print the white ink on the substrate area of a printing medium; and, sending second data channel information to a second inkjet unit of the inkjet head, and controlling the second inkjet unit to print the white ink on the embossed area of the printing medium.

12. The method, as recited in claim 11, wherein the first data channel information comprises substrate area information of a to-be-printed image and concentration information of the white ink used for printing the substrate area, and the second data channel information comprises embossed area information of the to-be-printed image and concentration information of the white ink used for printing the embossed area.

13. The method, as recited in claim 11, wherein the first data channel information comprises substrate area information of a to-be-printed image, concentration information of the white ink used for printing the substrate area, embossed area information of the to-be-printed image and concentration information of the white ink used for printing the embossed area; and the second data channel information comprises the embossed area information of the to-be-printed image and the concentration information of the white ink used for printing the embossed area.

14. A printing control device, comprising: at least one processor, at least one memory, and a computer program instruction of a printing control method stored in the memory, wherein: when the computer program instruction is executed by the processor, the printing control method is implemented through steps of:

acquiring first scan times, which is printing times of shuttle scan when an inkjet head ejects first ink to print a unit area on a printing medium;

acquiring second scan times, which is printing times of shuttle scan when the inkjet head ejects second ink to print another unit area on the printing medium;

comparing the first scan times with the second scan times; and, according to a comparison result, controlling a printer to eject the first ink or/and the second ink in each scan in a main scan direction, which comprises:

according to the comparison result, performing a filtering process on image data corresponding to the first ink or/and image data corresponding to the second ink to obtain first printing data corresponding to the first ink and second printing data corresponding to the second ink, and making scan times of printing the unit area according to the first printing data same as scan times of printing the another unit area according to the second printing data; and according to the first printing data and the second printing data, controlling the printer to eject the first ink and the second ink in the each scan in the main scan direction, wherein one of the first ink and the second ink is white ink.

15. The device, as recited in claim 14, wherein: when the computer program instruction is executed by the processor, the implemented printing control method further comprises steps of:

setting a value of the first scan times to "a", and setting a value of the second scan times to "b", wherein $a, b \in 2^n$, n is a natural number, and a length of an end face on which nozzles of an inkjet head are located is "x";

when a=b, ejecting the first ink and the second ink at the same time in each ink-ejecting process, and then moving the inkjet head by a distance of x/a relative to a printing medium.

16. The device, as recited in claim 14, wherein: when the computer program instruction is executed by the processor, the implemented printing control method further comprises steps of:

setting a value of the first scan times to "a", and setting a value of the second scan times to "b", wherein $a, b \in 2^n$, n is a natural number, and a length of an end face on which nozzles of an inkjet head are located is "x";

when $a \neq 1$ or $b \neq 1$, and $a/b \geq 1$, moving the inkjet head by a distance of x/a in a sub-scan direction which is perpendicular to the main scan direction after finishing each scan in the main scan direction; ejecting the first ink when the inkjet head is printing in the main scan direction after it moves by a distance of x/a in the sub-scan direction; and, ejecting the second ink when the inkjet head is printing in the main scan direction after it moves by a distance of x/b in the sub-scan direction.

17. The device, as recited in claim 14, wherein: when the computer program instruction is executed by the processor, the implemented printing control method further comprises steps of:

setting a value of the first scan times to "a", and setting a value of the second scan times to "b", wherein $a, b \in 2^n$, n is a natural number, and a length of an end face on which nozzles of an inkjet head are located is "x";

when $a/b < 1$, moving the inkjet head by a distance of x/b in a sub-scan direction which is perpendicular to the main scan direction after finishing each scan in the main scan direction; ejecting the first ink when the inkjet head is printing in the main scan direction after it moves by a distance of x/a in the sub-scan direction; and, ejecting the second ink when the inkjet head is printing in the main scan direction after it moves by a distance of x/b in the sub-scan direction.

18. The device, as recited in claim 14, wherein the first ink comprises white ink used for printing a substrate area and white ink used for printing an embossed area, and the second ink is one or more of cyan ink, magenta ink, yellow ink and black ink.

19. A storage medium, for saving a computer program instruction, wherein: when the computer program instruction is executed by a processor, the printing control method as recited in claim 1 is implemented.

* * * * *